UNITED STATES PATENT OFFICE.

ALEXANDER W. WINTER, OF SAN FRANCISCO, CALIFORNIA, ASSIGNOR OF ONE-HALF OF HIS RIGHT TO WILLIAM T. COLEMAN, OF SAME PLACE.

PROCESS OF PURIFYING FATS AND OILS.

SPECIFICATION forming part of Letters Patent No. 233,453, dated October 19, 1880.

Application filed June 22, 1880. (No model.)

*To all whom it may concern:*

Be it known that I, ALEXANDER W. WINTER, of the city and county of San Francisco, and State of California, have invented a Process for Bleaching, Refining, and Purifying Fats and Oils; and I hereby declare the following to be a full, clear, and exact description thereof.

My invention relates to the bleaching, refining, and purifying of tallow, lard, oil, stearic acid, and other dark animal oils and fats, and also of certain vegetable oils, in an economical manner, without the use of acids or any poisonous or deleterious chemicals.

Hitherto it has been customary to treat vegetable and animal oils either by distillation or with chemicals in order to remove the impurities and the coloring-matter. These methods are tedious and expensive, and are therefore not economical for the treatment of oils and fats for various purposes and uses.

I have discovered that fuller's earth will remove the impurities from animal oils and fats and from certain vegetable oils, and that it also has an affinity for the coloring-matters of these oils and fats, so that by the treatment of them with said fuller's earth they are purified and rendered practically colorless.

My invention therefore consists in mixing with such oils and fats reduced to a liquid condition pulverized dry fuller's earth, and then separating the earth from the oil or fat, preferably by allowing it to settle in the same vessel or removing it to another vessel to settle.

In carrying out my invention I take the oil or fat to be purified in any desired quantity, place it in any ordinary vessel suited for the purpose, and warm it until it is in a suitably liquid condition.

The degree of temperature required will, of course, vary with the different kind of oil or fat; and I do not deem it, therefore, necessary to specify any particular degree of heat, it being simply sufficient that the material to be treated should be reduced to a perfectly liquid state. When the fat or oil is in such a proper state of liquefaction I spread over its surface and mix with it a quantity of fuller's earth, or equivalent clay, which should be finely pulverized. After this has been thoroughly agitated and mixed it is allowed to settle. The fuller's earth will then be found at the bottom, and the oil or fat left perfectly free from all impurities and from coloring-matter, but in other respects unchanged and ready for use in the making of soap or candles, or for any such purpose where pure, colorless oil or fat is required or desirable. The residuum, consisting of fuller's earth mixed with oil, after the clear portion has been drawn off, may be put into boiling water, which separates the oil or fat from the earth and permits it to rise to the top, where it can be recovered. The refuse may then be thrown away or utilized in any desired manner.

The amount of fuller's earth which I have found to be necessary varies with the different kinds of fats and oils, but may be stated at from one to fifteen per cent. in weight of the fat or oil to be treated thereby.

Obviously no stills or other expensive machinery are needed, the only apparatus required being an ordinary vessel of suitable capacity in which to warm the oil or fat, and, if desired, one or more settling-tanks, separate or connected.

This process is designed mainly for the treatment of animal oils and fats, such as those hereinbefore specified. I have found, however, that the treatment, though not applicable to many of the vegetable oils, may be advantageously applied to the treatment of cotton-seed oil, mustard-seed oil, and cocoanut-oil, and may also be applied effectively to other oils of like constitution. In no case, however, have I found necessary, nor do I contemplate, the use, with my process, of any acid or other chemical treatment, or the mixture of any other substance.

I am aware that fuller's earth has been heretofore suggested in the English provisional specification No. 3,721 of 1867, in connection with a preliminary sulphuric-acid treatment for the purification of paraffine. I do not therefore broadly claim the use of fuller's earth in connection with other matters, or as an element in the purification of mineral oils.

I am aware that pumice and other magnesian earths, silica, and silicious earths, in connection with acid treatment or other processes, have been heretofore known in the treatment of oils, and I do not broadly claim such, my process being confined to an argillaceous nonaluminous clay, such as fuller's earth. In the treatment of mineral oils, however, I have found the simple application with fuller's earth as I use it effective for the purpose of removing impurities, and at the same time removing the coloring-matter, and I confine my claim, therefore, to the treatment of animal oils and fats, and certain vegetable oils, as specified, by means of fuller's earth taken alone, the fuller's earth having for these specified fats and oils a special fitness by reason of its affinity for the coloring-matter contained in them.

By means of this process I am enabled to prepare, in an inexpensive manner, the dark and cheap oils and fats, and to render them practically colorless and fit to be used in the manufacture of soaps, candles, and other articles.

What I claim, therefore, is—

The described process of treating animal fats and oils and certain vegetable oils, by reducing them to a liquid condition, mixing therewith pulverized fuller's earth in substantially the proportion specified, and then separating the earth from the oil or fat, as and for the purpose set forth.

In witness whereof I have hereunto set my hand.

ALEX. W. WINTER.

Witnesses:
GEO. H. STRONG,
S. H. NOURSE.